United States Patent
Martinez Flores et al.

(10) Patent No.: US 12,422,072 B2
(45) Date of Patent: Sep. 23, 2025

(54) QUICK-CONNECT CLIP ASSEMBLY FOR AN EVAPORATIVE EMISSIONS CANISTER PORT

(71) Applicant: PHINIA Jersey Holdings LLC

(72) Inventors: Jonathan Rosalio Martinez Flores, Ciudad Juarez (MX); Cesar Cain Chavez Sandoval, Ciudad Juarez (MX)

(73) Assignee: PHINIA JERSEY HOLDINGS LLC, Wilmington, DE (US)

( * ) Notice: Subject to any disclaimer, the term of this patent is extended or adjusted under 35 U.S.C. 154(b) by 0 days.

(21) Appl. No.: 18/405,150

(22) Filed: Jan. 5, 2024

(65) Prior Publication Data

US 2025/0224061 A1    Jul. 10, 2025

(51) Int. Cl.
| | |
|---|---|
| F16L 37/133 | (2006.01) |
| F16L 37/088 | (2006.01) |
| F16L 37/12 | (2006.01) |
| F16L 37/14 | (2006.01) |
| F02M 25/08 | (2006.01) |

(52) U.S. Cl.
CPC ....... F16L 37/1225 (2013.01); F16L 37/0885 (2019.08); F16L 37/133 (2013.01); F16L 37/144 (2013.01); F02M 25/0854 (2013.01)

(58) Field of Classification Search
CPC . F16L 37/133; F16L 37/1225; F16L 37/1205; F16L 37/142; F16L 37/144; F16L 37/148; F16L 37/123; F16L 37/0885; Y10S 285/921; Y10T 24/45183; Y10T 24/45791; Y10T 24/4599
See application file for complete search history.

(56) References Cited

U.S. PATENT DOCUMENTS 3,948,548 A * 4/1976 Voss .................... F16L 37/0885
                                                    285/321
2001/0043833 A1* 11/2001 Bahner ............... F16L 37/0885
                                                    403/187
(Continued)

FOREIGN PATENT DOCUMENTS

DE    4240136 C1 *  6/1993  ............ F16L 37/107
EP    1429066 A1 *  6/2004  ............ F16L 23/036
(Continued)

Primary Examiner — Matthew Troutman
Assistant Examiner — James A Linford
(74) Attorney, Agent, or Firm — WARNER NORCROSS + JUDD LLP

(57) ABSTRACT

A quick-connect clip assembly for an evaporative emissions canister is provided. The assembly includes a quick-connector clip and a housing. The quick-connector clip includes a flexible, arcuate body, a pair of guide posts extending from the body, a pair of finger grips adjacent terminal ends of the body, and a pair of interlocking snaps extending inwardly from the finger grips. The housing includes a tubular wall having an open end, a first pair of arcuate slots adjacent the open end and extending radially along a same circumference of the wall, and a second pair of arcuate slots extending radially along the said same circumference. The body is disposed within the housing, the finger grips extend through the first pair of slots, the guide posts extend through the second pair of slots, and the snaps are disposed outside the wall. An evaporative emissions canister including the clip assembly is also provided.

19 Claims, 14 Drawing Sheets

(56) References Cited

U.S. PATENT DOCUMENTS

2018/0142823 A1* 5/2018 Zbiral .................. F16L 37/123
2018/0372040 A1* 12/2018 French ............. F02M 35/10354

FOREIGN PATENT DOCUMENTS

| EP | 3364089 | A1 | * | 8/2018 | ............. | B29C 45/33 |
| EP | 3875825 | A1 | * | 9/2021 | ............. | B33Y 80/00 |
| FR | 2856770 | A1 | * | 12/2004 | ............. | F16L 21/06 |

* cited by examiner

QUICK-CONNECT CLIP ASSEMBLY FOR AN EVAPORATIVE EMISSIONS CANISTER PORT

FIELD OF THE INVENTION

The disclosure generally relates to evaporative emissions canisters and, more specifically, to a quick-connect clip assembly for connection with an evaporative emissions canister port.

BACKGROUND OF THE INVENTION

Conventional clips suffer from the problem that once the clip is assembled to mate a female inlet with a male connector, there is no way to easily remove the mated connector part. In other words, disassembly of the mated connection is difficult or impossible without damaging the clip or mated parts. Further, typically more than one clip is necessary for safety redundancy or to meet the retention load requirements for the connection. Additionally, some conventional quick connectors require a complex molding process for fabrication due to their geometry. Therefore, a need exists for a quick-connect clip assembly that overcomes at least one of the deficiencies of conventional clips, such as being easily assembled and disassembled and thus capable of reuse and easy servicing of associated parts.

BRIEF SUMMARY

An improved quick-connect clip assembly for an evaporative emissions canister port is provided. The improved quick-connect clip assembly can be easily opened and closed, and thus is capable of being quickly and easily disassembled for service or replacement of parts. The clip assembly includes a quick-connector clip including a flexible, arcuate body having an inner surface and an outer surface. The arcuate body extends arcuately from a first terminal end to a second terminal end. A pair of guide posts including a first guide post and a second guide post each extend outwardly from the outer surface of the body. The clip further includes a pair of finger grips including a first finger grip and a second finger grip. The first finger grip is disposed adjacent the first terminal end of the body and extends outwardly from the outer surface of the body, and the second finger grip is disposed adjacent the second terminal end of the body and extends outwardly from the outer surface of the body. The clip further includes a pair of interlocking snaps including a first snap element and a second snap element. The first snap element extends inwardly from the first finger grip, and the second snap element extends inwardly from the second finger grip and towards the first snap element. Squeezing of the finger grips draws the first and second snap elements towards each other and causes the first and second snap elements to mate together. The assembly further includes a housing including a tubular wall having an open end and defining a receiver therein. The tubular wall includes a first pair of arcuate slots adjacent the open end. The first pair of arcuate slots includes a first arcuate slot and a second arcuate slot that each extend radially along a same circumference of the tubular wall. The tubular wall further includes a second pair of arcuate slots adjacent the open end. The second pair of arcuate slots includes a third arcuate slot and a fourth arcuate slot that each extend radially along the said same circumference of the tubular wall. The body of the quick-connector clip is disposed within the receiver, the first finger grip extends through the first arcuate slot, the second finger grip extends through the second arcuate slot, the first guide post extends through the third arcuate slot, the second guide post extends through the fourth arcuate slot, and the first and second snap elements are disposed outside of the tubular wall.

In specific embodiments, the inner surface of the arcuate body includes a pair of chamfers.

In particular embodiments, the chamfers are between the guide posts and the terminal ends of the arcuate body.

In specific embodiments, the first and second finger grips each include an inner surface and an outer surface. The inner surface of the first finger grip faces the inner surface of the second finger grip, and the first snap element extends from the inner surface of the first finger grip and the second snap element extends from the inner surface of the second finger grip.

In specific embodiments, the first and second finger grips each include a terminal portion that is bent outwards, and the terminal portion includes a contoured gripping surface.

In specific embodiments, each of the first and second snap elements includes a base connected to its respective finger grip, a terminal lock part, and a bent portion extending between the base and the terminal lock part.

In particular embodiments, each of the finger grips includes a first side surface and an opposite second side surface. The base of the first snap element is adjacent the first side surface of the first finger grip, and the base of the second snap element is adjacent the second side surface of the second finger grip.

In specific embodiments, in relation to the body, the first finger grip is generally opposite the first guide post, and the second finger grip is generally opposite the second guide post.

In specific embodiments, the quick-connector clip is of a single piece, unitary construction.

In specific embodiments, the first and second arcuate slots have a same radial length, and the third and fourth arcuate slots have a same radial length.

In specific embodiments, the radial length of the first and second arcuate slots is larger than the radial length of the third and fourth arcuate slots.

In specific embodiments, the first arcuate slot is adjacent the third arcuate slot, and the second arcuate slot is adjacent the fourth arcuate slot.

In specific embodiments, the tubular wall of the housing further includes an arcuate depression in which the first and second snap elements are disposed, and the arcuate depression extends between the first arcuate slot and the second arcuate slot.

In specific embodiments, the assembly further includes a male connector including a tubular end form and a bead circumscribing the tubular end form. The tubular end form is received in the receiver of the housing such that the bead is positioned inward relative to the quick-connector clip, the first and second snap elements are drawn towards each other by squeezing the first and second finger grips together, and the first and second snap elements are interlocked whereby the body of the quick-connector clip blocks the bead of the male connector to prevent release of the male connector from the receiver.

In specific embodiments, the male connector is a port of the evaporative emissions canister.

A method of quick-connection to a port is also provided. The method includes providing a quick-connect clip assembly as described in the preceding paragraphs. The method next includes mating a male connector with the receiver of the clip assembly, wherein the male connector is the port and includes a tubular end form and a bead circumscribing the tubular end form, and the tubular end form is inserted into the receiver of the housing such that the bead is positioned inward relative to the quick-connector clip. The method further includes squeezing the first and second finger grips of the quick-connector clip towards each other to flex and compress the body of the quick-connector clip until the first and second snap elements engage and interlock, wherein the compressed body of the quick-connector clip has a diameter that is less than a diameter of the bead of the male connector whereby the body blocks the bead of the male connector to prevent release of the male connector from the receiver.

In specific embodiments, the method further includes disconnecting the male connector from the receiver by further squeezing the first and second finger grips to separate and disengage the first and second snap elements such that the body of the quick-connector clip returns to a resting configuration having a diameter that is greater than the diameter of the bead of the male connector whereby the male connector is freely removable from the receiver of the housing.

An evaporative emissions canister including the quick-connect clip assembly is also provided.

In specific embodiments, the evaporative emissions canister includes a fluid port having a male connector, and the clip assembly is mated with the male connector.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

Figure 1:
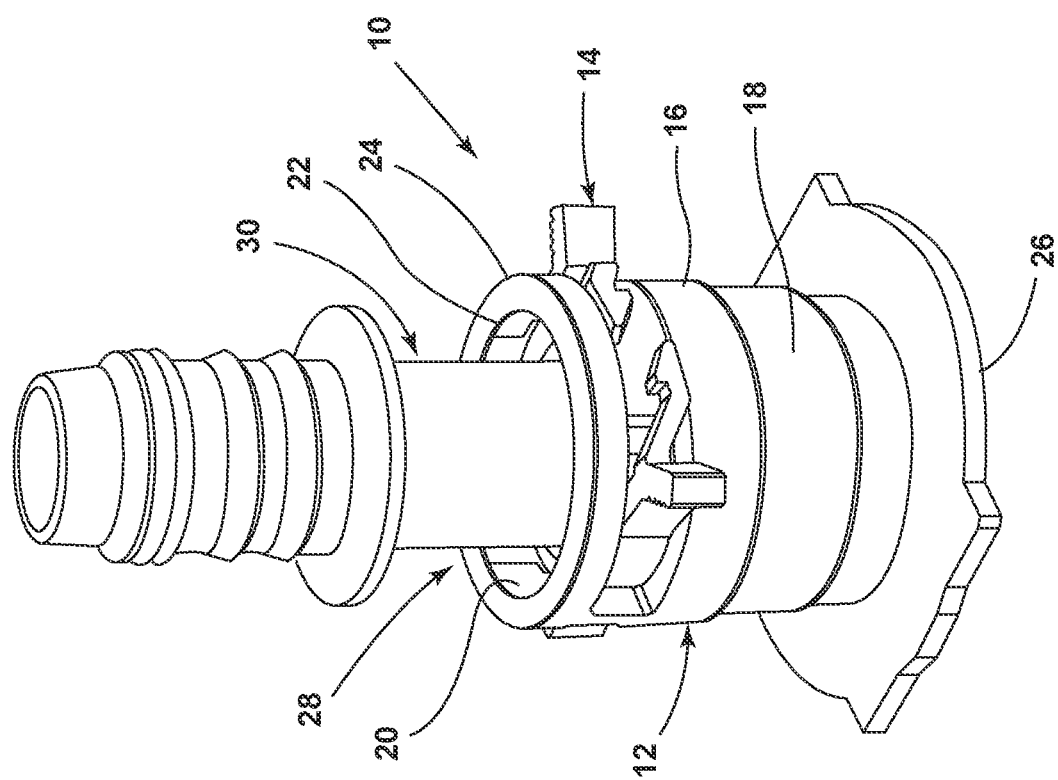
FIG. 1 is a perspective view of a quick-connect clip assembly in accordance with embodiments of the disclosure, the clip assembly being in an open configuration.

A quick-connect clip assembly including a quick-connector clip and a housing is provided. Referring to FIGS. 1-17, wherein like numerals indicate corresponding parts throughout the several views, the clip assembly is illustrated and generally designated at 10. In exemplary embodiments, the clip assembly 10 is connected to a port of an evaporative emissions (e.g., fuel vapor) canister and/or may be integrally included in a connector fitting (e.g., elbow fitting) that connects the port to another component of the evaporative emissions canister. However, it should be understood that other applications of the clip assembly 10 are within the scope of the disclosure. The clip assembly 10 is easily opened and closed as desired, and thus allows for quick and easy connection and disconnection of associated parts for service and replacement purposes. Certain features of the clip assembly 10 are functional, but can be implemented in different aesthetic configurations.

With reference first to FIGS. 1-9, the clip assembly 10 generally includes a housing 12 and a quick-connector clip 14 (also referred to herein as simply a clip member). The housing 12 includes a tubular wall 16 having an outer surface 18 and an inner surface 20 that defines a fluid passageway or through bore 22 that extends from one open end 24 of the housing to an opposite open end 26 of the housing. The open end 24 of the housing 12 and the adjacent portion of the through bore 22 define a receiver 28 within the tubular wall 16. The receiver 28 is adapted (sized, shaped, etc.) to receive a male connector 30 or other similar male end form, and as such, the receiver is a female coupler the cooperatively engages the male connector. In some embodiments shown below, both open ends of the housing are female coupling ends.

As shown in FIGS. 3-6, the clip member 14 is formed of a single, piece, unitary construction and includes a flexible, resilient, arcuate body 32 having an inner surface 34 and an outer surface 36. The arcuate body 32 extends arcuately from a first terminal end 38a to a second terminal end 38b and as such is a segment of an annulus forming a semi-circular open band or cuff. A first guide post 40a and a second guide post 40b each extend outwardly from the outer surface 36 of the arcuate body 32. The first and second guide posts 40a,b may have the same shape but face in opposite directions and as such, are mirror images of each other about a centerline of the clip member 14. More particularly, the guide posts 40a,b are spaced from each other and generally equidistantly spaced from the centerline, and generally distal from the terminal ends 38a,b of the arcuate body 32. The guide posts 40a,b extend at an angle relative to the outer surface 36 of the arcuate body 32 and are short (have a much smaller length) relative to the diameter of the arcuate body. For example, the length of the guide posts 40a,b may be a fraction of the diameter of the arcuate body 32, such as between ⅕ and 1/10 of the diameter. The guide posts 40a,b also have an angled/inclined edge 42 of which purpose is described in more detail below. Further, the guide posts 44a,b aide in locating the clip member 14 in the housing 12 as well as providing structural support for the clip assembly 10 when the clip assembly secures a connection of the housing to a connector part such as a male port.

The clip member 14 further includes a first finger grip 44a adjacent the first terminal end 38a of the arcuate body 32 and a second finger grip 44b adjacent the second terminal end 38b of the arcuate body 32. In relation to the arcuate body 32, the first finger grip 44a is generally opposite the first guide post 40a, and the second finger grip 44b is generally opposite the second guide post 40b. The first and second finger grips 44a,b may have the same shape but face in opposite directions and as such, are mirror images of each other about the centerline of the clip member 14. More particularly, the first and second finger grips 44a,b each extend outwardly from the outer surface 36 of the arcuate body 32. The first finger grip 44a includes an inner (inwardly facing) surface 46a and an outer (outwardly facing) surface 48a, and likewise the second finger grip 44b includes an inner (inwardly facing) surface 46b and an outer (outwardly facing) surface 48b. The inner surface 46a of the first finger grip 44a faces the inner surface 46b of the second finger grip 44b. The first finger grip 44a also includes a first side surface 50a and a second side surface 52a, and likewise the second finger grip 44b includes a first side surface 50b and a second side surface 52b. The first and second finger grips 44a,b each further include a terminal portion 54a,b, respectively, that are bent outwards and have a contoured gripping surface 56a,b, respectively, on their outer sides.

The clip member 14 further includes a pair of interlocking snaps including a first snap element 58a extending inwardly from the first finger grip 44a and a second snap element 58b extending inwardly from the second finger grip 44b and towards the first snap element 58a. The first and second snap elements 58a,b may have the same shape but face in opposite directions and are inverted relative to each other. More particularly, the first snap element 58a includes a base 60a connected to the first finger grip 44a, a terminal lock part 62a, and a bent portion 64a extending between the base 60a and the terminal lock part 62a. Likewise, the second snap element 58b includes a base 60b connected to the second finger grip 44b, a terminal lock part 62b, and a bent portion 64b extending between the base 60b and the terminal lock part 62b. Since the first and second snap elements 58a,b are inverted relative to each other, the base 60a of the first snap element 58a is disposed adjacent the first side surface 50a of the first finger grip 44a, while the base 60b of the second snap element 58b is disposed adjacent the second side surface 52b of the second finger grip 44b. The bent portions 64a,b of the respective snap elements 58a,b may be flexible to allow for movement of the positions of the terminal lock parts 62a,b. The lock parts 62a,b face each other and as such are opposed to each other in a locked configuration discussed in more detail below. Each lock part 62a,b may have a triangular block shape and respectively include a tip 66a,b, an inclined ramp surface 68a,b extending from the tip 66a,b toward the bent portion 64a,b, and a stop surface 70a,b at the end of the ramp surface 68a,b and adjacent the bent portion 64a,b.

The clip member 14 further includes a pair of chamfers 72 along an edge of the inner surface 34 of the arcuate body 32, and as such the inner surface has a chamfered edge. The two chamfers 72 are spaced from each other. One of the chamfers 72 is disposed between the first guide post 40a and the first terminal end 38a, while the other of the chamfers 72 is disposed between the second guide post 40b and the second terminal end 38b.

Aside from the inversion of the first and second snap elements 58a,b, the clip member 14 is symmetrical about the centerline that extends through the center of the arcuate body 32 and divides the clip member into two halves.

Figure 3:
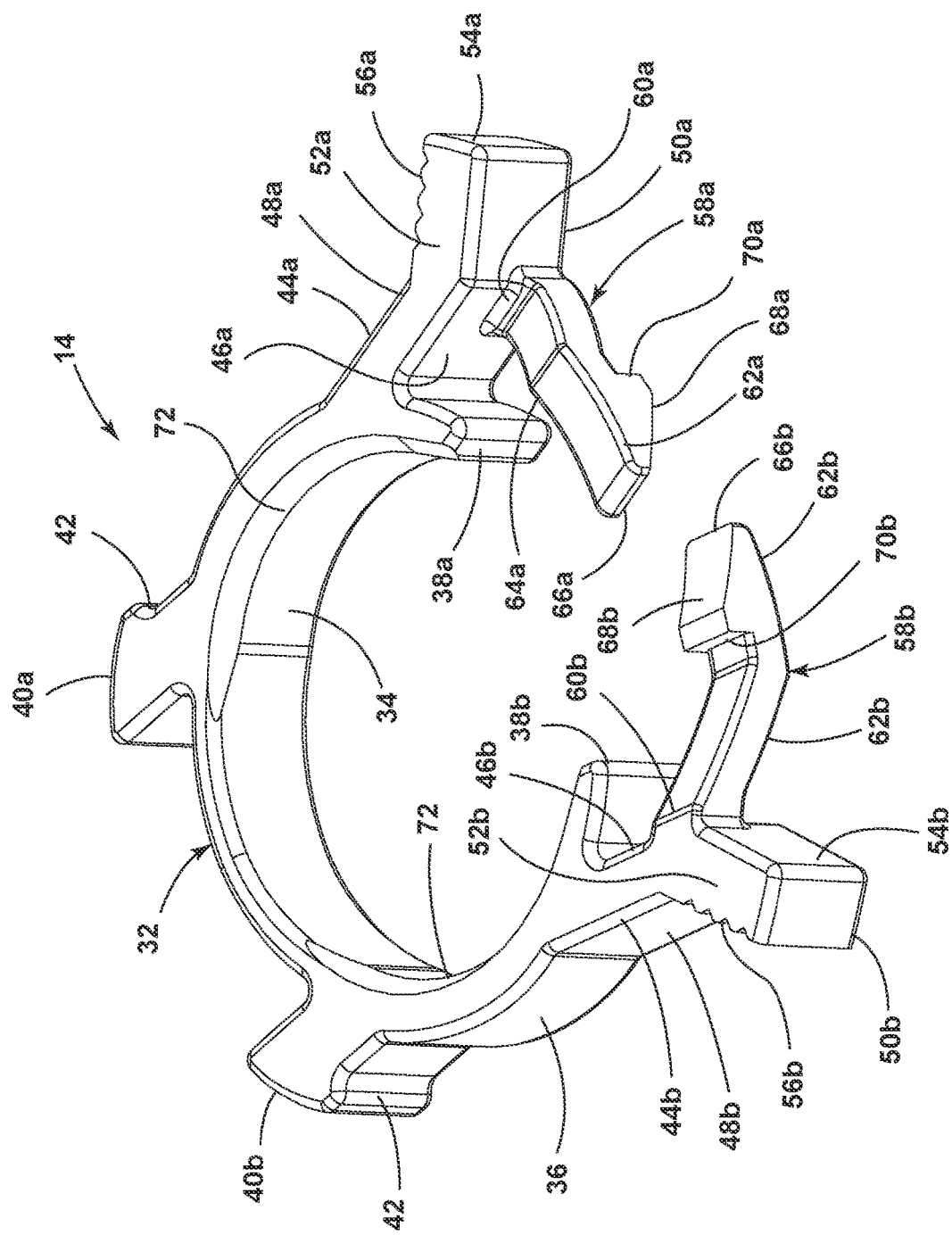
FIG. 3 is a perspective view of a clip member of the clip assembly in the open configuration.
Figure 4:
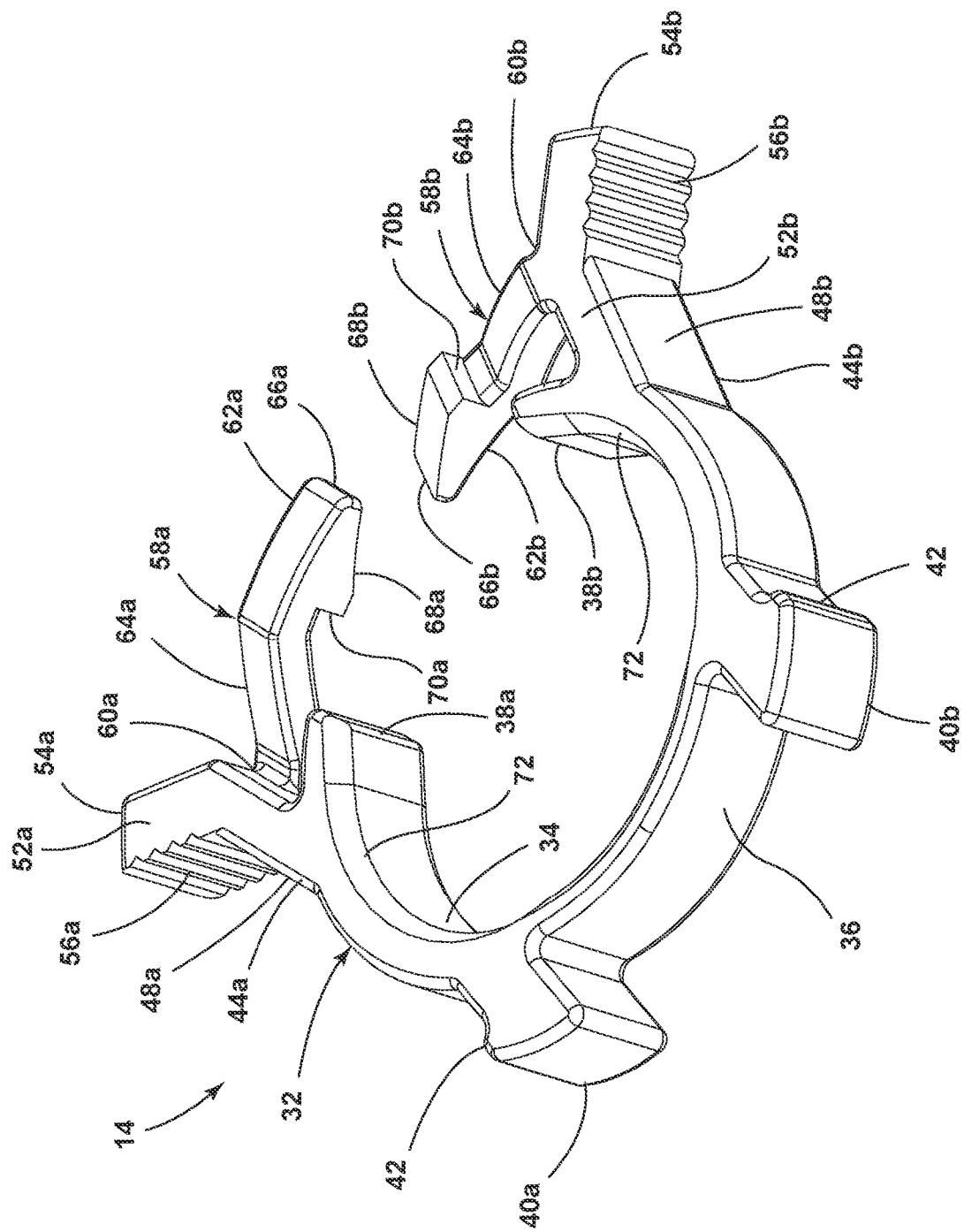
FIG. 4 is another perspective view of the clip member of FIG. 3.
Figure 5:
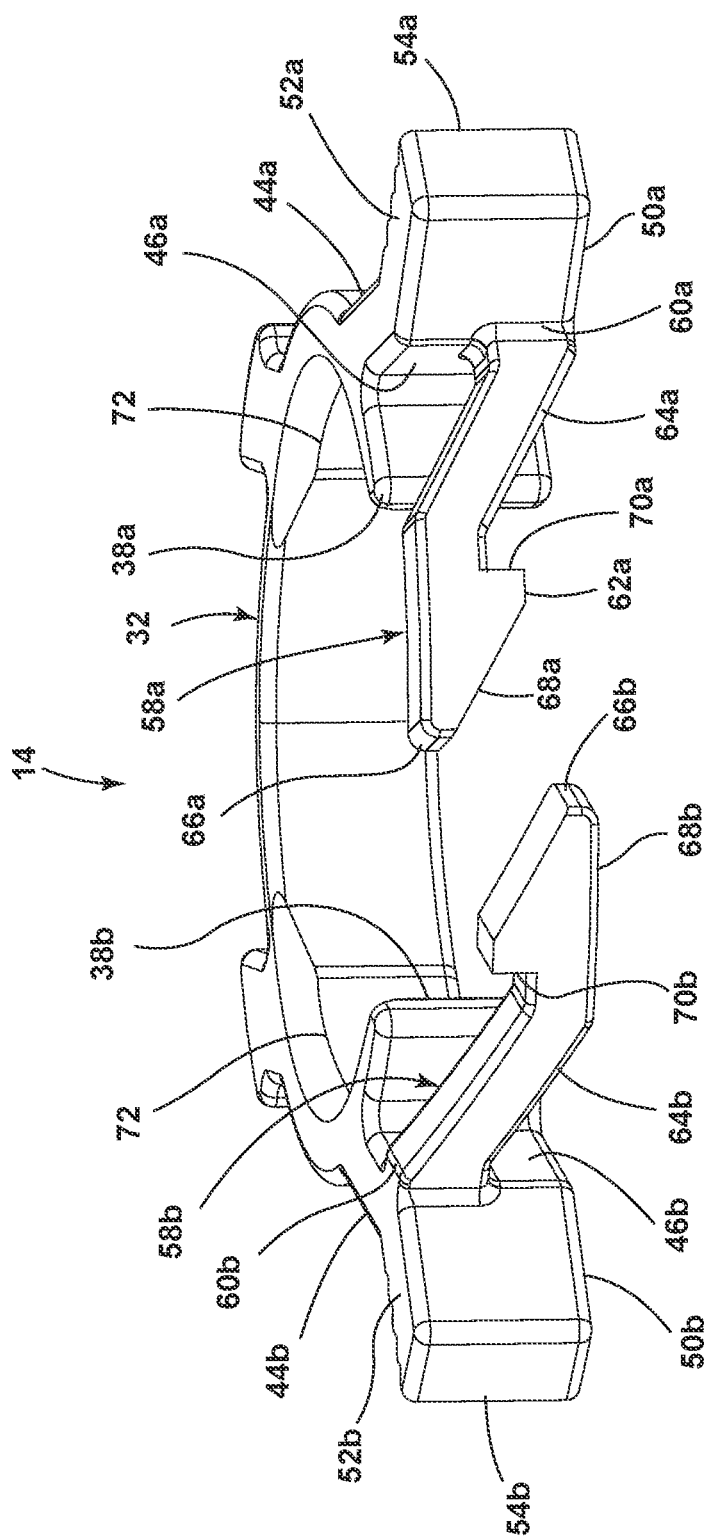
FIG. 5 is a side view of the clip member of FIG. 3.
Figure 6:
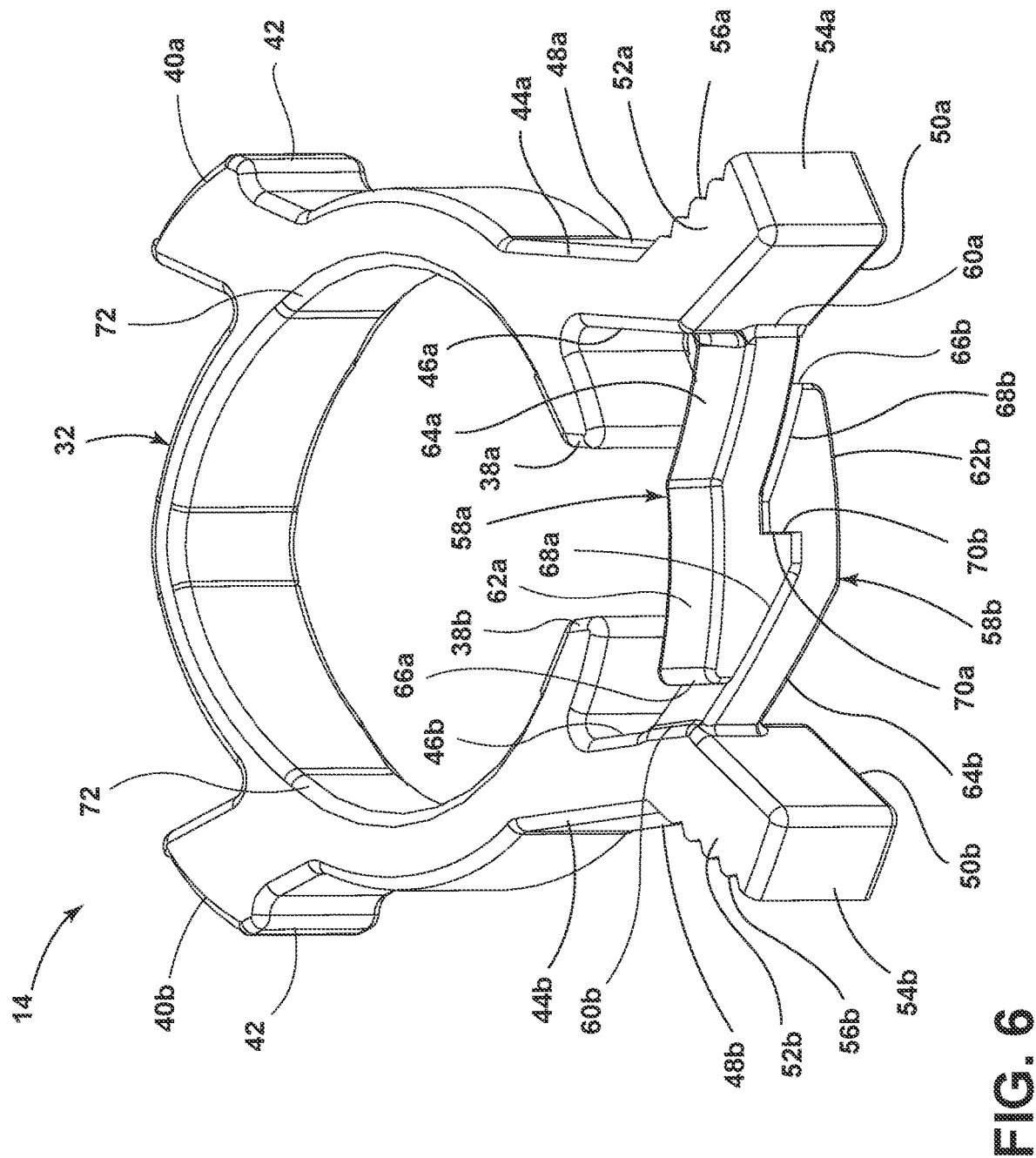
FIG. 6 is a perspective view of the clip member in the closed configuration.

An open (unsnapped, unlocked, resting) configuration of the clip member 14 is shown in FIGS. 3-5 and a closed (snapped, locked) configuration is shown in FIG. 6. In the open, resting configuration, there is no tension or force applied to the arcuate body 32 and the snap elements 58a,b are spaced from each other. Squeezing of the finger grips 44a,b, however, causes the arcuate body 32 to flex and bend about the centerline and draws the snap elements 58a,b towards each other until the snap elements mate together to lock and hold the clip member 14 in the closed configuration. In particular, as the snap elements 58a,b are drawn together the tips 66a,b pass each other, the ramp surfaces 68a,b engage and slide against each other causing the snap elements 58a,b to flex in opposite directions, and when the stop surfaces 70a,b become aligned they snap into engagement, hold the clip member 14 in the closed configuration, and prevent the arcuate body 32 from returning back to the open, resting configuration.

Turning now to FIGS. 1, 2, and 7-9, the clip member 14 is cooperable with the housing 12. More particularly, the tubular wall 16 of the housing 12 includes a first pair of arcuate slots adjacent (in close proximity to) the open end 24 of the housing 12. The first pair of arcuate slots includes a first arcuate slot 74a and a second arcuate slot 74b that each extend radially along a same circumference of the tubular wall. The first and second arcuate slots 74a,b generally have the same size and shape including the same radial length, and provide access from the exterior of the housing into the passageway/receiver within the interior of the housing. The tubular wall 16 further includes a second pair of arcuate slots adjacent (in close proximity to) the open end 24. The second pair of arcuate slots include a third arcuate slot 74c and a fourth arcuate slot 74d that each extend radially along the same circumference of the tubular wall which is also the same circumference as the first and second arcuate slots 74a,b. The third and fourth arcuate slots 74c,d generally have the same size and shape including the same radial length, and provide access from the exterior of the housing into the passageway/receiver within the interior of the housing. The third and fourth arcuate slots 74c,d have a shorter length in the radial direction than the first and second arcuate slots 74a,b; for example, the length of the third and fourth arcuate slots may be ⅓ to ⅕ that of the first and second arcuate slots. Stated differently, the radial length of the first and second arcuate slots is larger than the radial length of the third and fourth arcuate slots. Further, the first arcuate slot 74a is adjacent (neighbors) the third arcuate slot 74c and the second arcuate slot 74b is adjacent (neighbors) the fourth arcuate slot 74d. Additionally, the tubular wall 16 of the housing 12 includes an arcuate depression 76 that extends between the first and second arcuate slots 74a,b from the first arcuate slot 74a to the second arcuate slot 74b. The arcuate body 32 of the clip member 14 is disposed within the receiver 28 of the housing 12. Specifically, one of the terminal ends 38a is inserted through the second arcuate slot 74b with the guide posts 40a,b facing away from the housing. Once the terminal end 38a passes across the receiver to the first arcuate slot 74a, the clip member 14 is rotated such that the guide posts 40a,b are aligned with the third and fourth arcuate slots 74c,d, the first finger grip 44a extends through the first arcuate slot 74a so that the first finger grip terminal portion 54a is positioned outside of the tubular wall 16, and the second finger grip 44b extends through the second arcuate slot 74*b* so that the second finger grip terminal portion 54*b* is also positioned outside of the tubular wall 16. The chamfers 72 aid in the sliding and manipulation of the clip member 14 through the first and second arcuate slots 74*a,b*. The clip member 14 is then centered around the perimeter of the receiver such that the first guide post 40*a* extends through the third arcuate slot 74*c* and the second guide post 40*b* extends through the fourth arcuate slot 74*d*. In this disposition, the first and second snap elements 58*a,b* are disposed in the arcuate depression 76 on the exterior of the housing 12.

Figure 2:
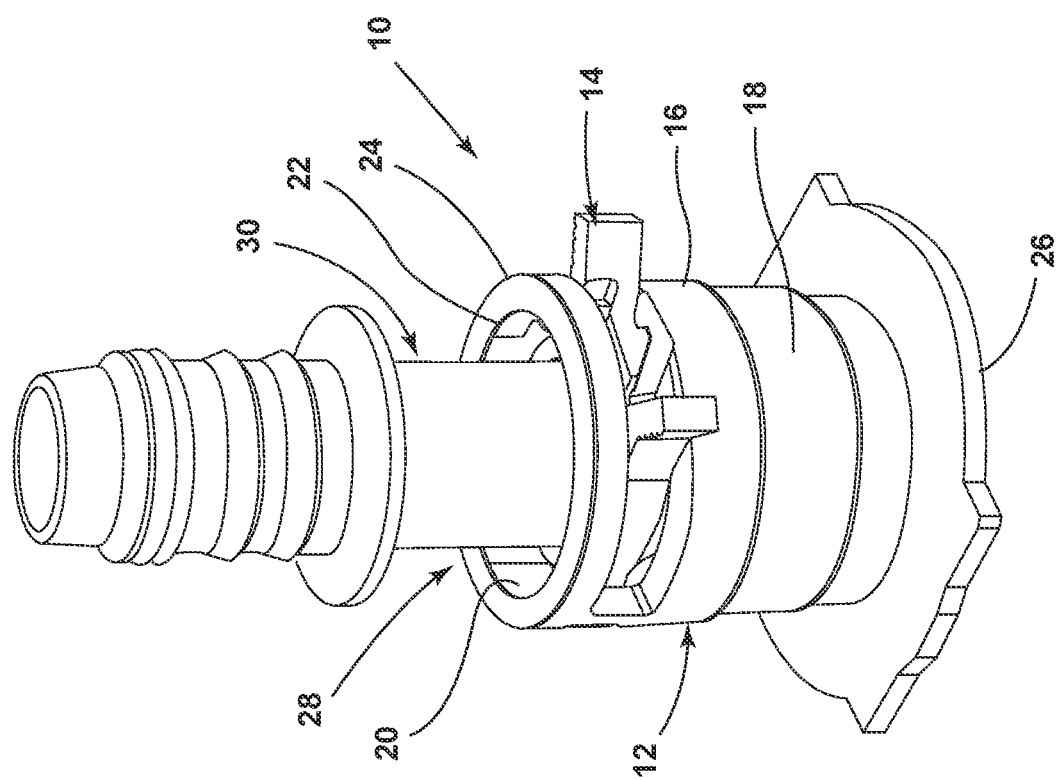
FIG. 2 is a perspective view of the clip assembly in a closed configuration.
Figure 7:
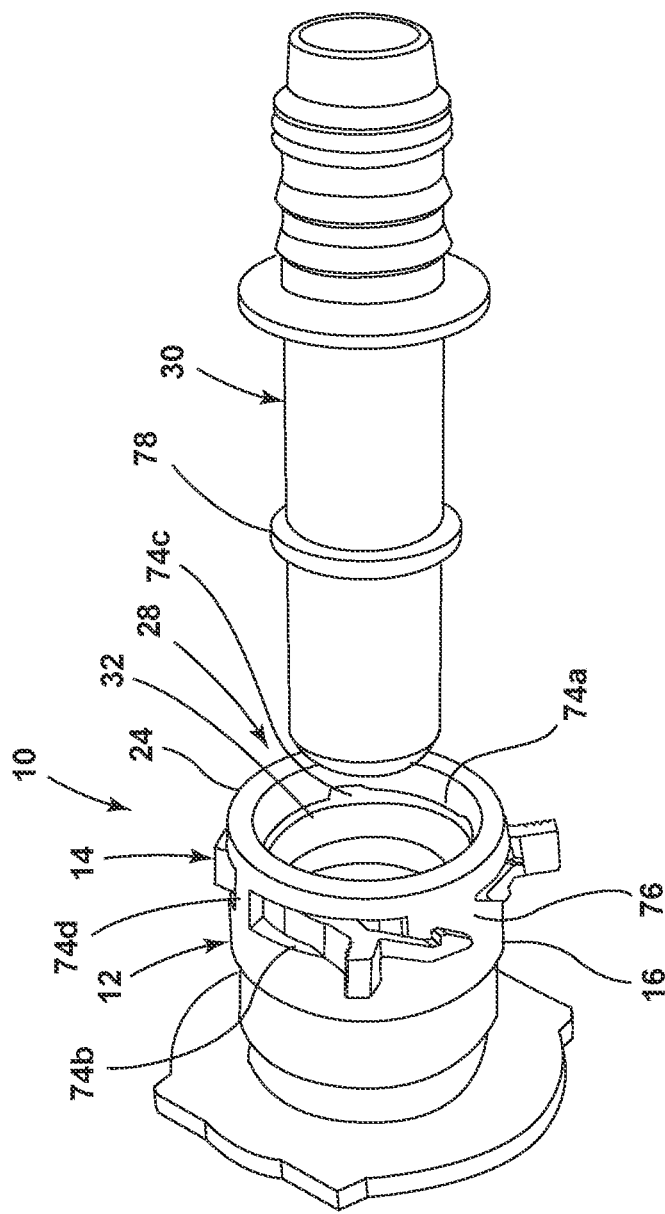
FIG. 7 is an environmental view of male connector being inserted into the clip assembly.
Figure 9:
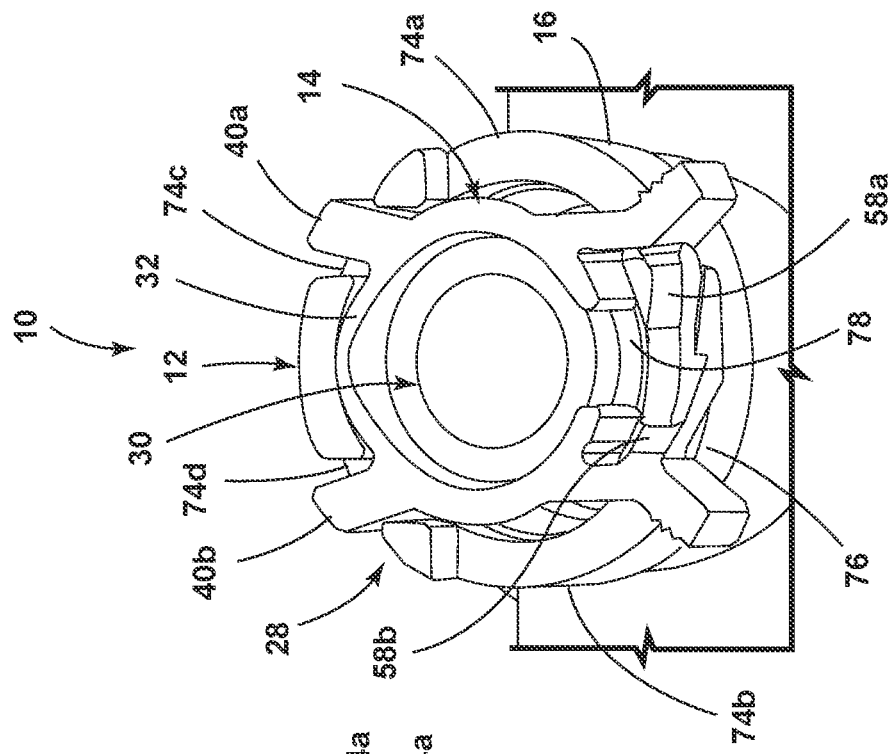
FIG. 9 is a sectional view of the clip assembly in the closed configuration.
Figure 8:
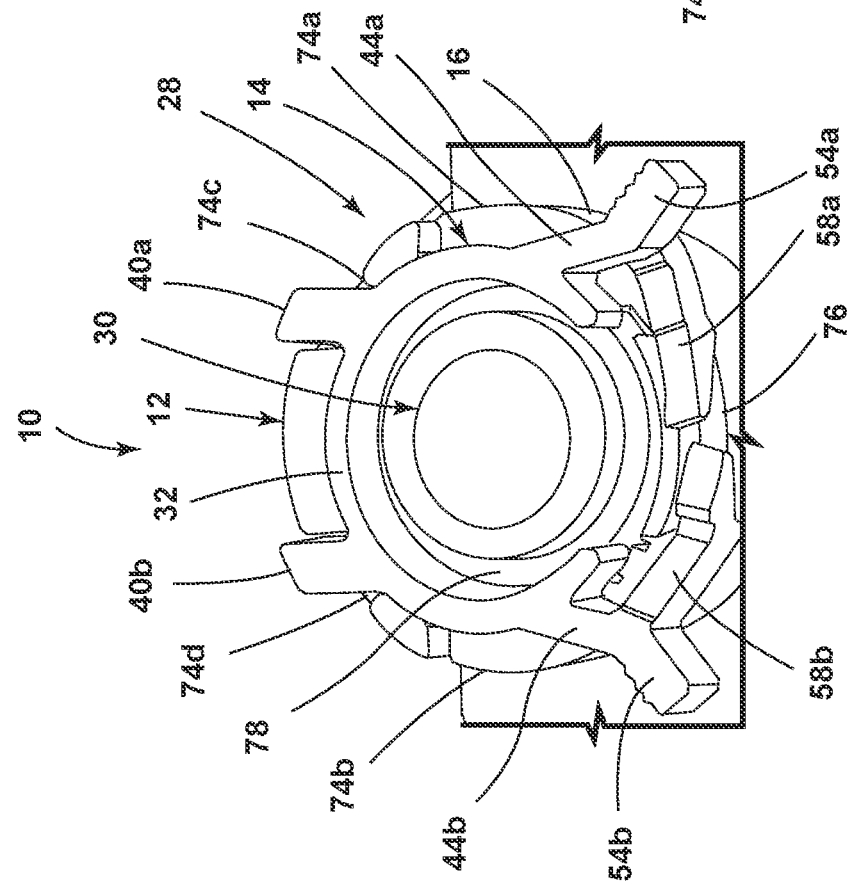
FIG. 8 is a sectional view of the clip assembly in the open configuration.
Figure 10:
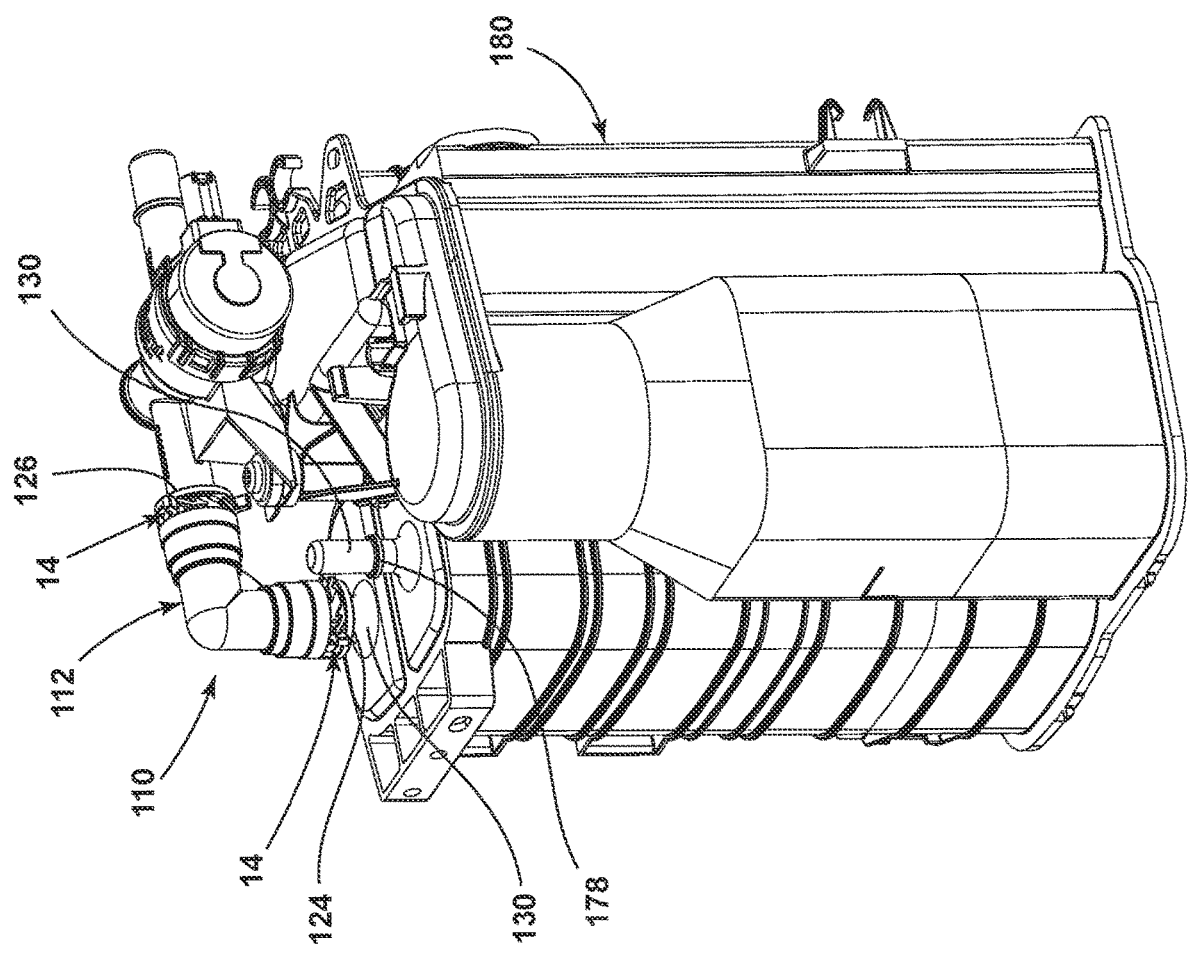
FIG. 10 is a perspective view of an evaporative emissions canister including the clip assembly in accordance with embodiments of the disclosure.

With reference to FIG. 7, to mate a male connector 30 with the clip assembly 10, the male connector 30 is aligned with the receiver 28 at the open end 24 of the housing 12. The male connector 30 is a tubular end form and includes a bead 78 or other similar annular flange that circumscribes the tubular end form. Next, as shown in FIGS. 1, 7, and 8, with the clip member 12 in the open configuration, the male connector 30 is inserted into and received in the receiver 28 of the housing 12 until the bead 78 is positioned inward in the passageway relative to clip member 14. Then, as shown in FIGS. 2 and 9, the first and second snap elements 58*a,b* are drawn towards each other by squeezing the first and second finger grips 44*a,b* together until the first and second snap elements 58*a,b* are interlocked to place the clip member 14 in the closed configuration. In the closed configuration, the flexed, compressed arcuate body 32 of the clip member 14 blocks the bead 78 of the male connector 30 to secure and prevent release of the male connector from the receiver 28. As can be seen in FIG. 9, in the closed disposition the compressed body 32 of the clip member 14 has a diameter that is less than a diameter of the bead 78 of the male connector 30 which limits travel of the male connector out of the receiver 28. Further, the location of the guide posts 44*a,b* in the arcuate slots 74*c,d* supports the clip member 14 against axial loads exerted by the bead 78 of the male connector 30 if the male connector is pulled in an outward direction.

To disconnect the male connector 30 from the receiver 28, the first and second finger grips 44*a,b* are further squeezed together to disengage the stop surfaces 70*a,b* of the snap elements 58*a,b*, and then the finger grips 44*a,b* are allowed to move apart so that the snap elements 58*a,b* slide past each other and the clip member 14 is allowed to return to the relaxed, resting, open configuration in which the diameter of the arcuate body 32 is greater than the diameter of the bead 78 of the male connector 30. Thus, the male connector is freely removable from the receiver 28.

With reference now to FIGS. 10-17, in some embodiments the clip assembly 110 is used with and incorporated into an evaporative emissions canister (fuel vapor storage canister) 180 for a fuel tank of a vehicle fuel system that pumps liquid fuel, by way of non-limiting example gasoline fuel, from a fuel tank (not shown) to an internal combustion engine (not shown) that powers an automotive vehicle. The evaporative emissions canister 180 generally includes a canister housing having an internal volume that stores an adsorbent material capable of adsorbing and desorbing fuel vapors. The evaporative emissions canister 180 adsorbs and thereby traps fuel vapors that arise in the fuel tank during periods of non-use of the internal combustion engine due to, for example, daily variations in ambient temperatures. During periods of operation of the internal combustion engine, the trapped fuel vapors are purged from the canister and delivered to the air intake of the engine to be added to the fuel/charge air mixture and combusted within the engine.

The structure and function of an evaporative emissions canister is known in the art and will not be discussed in further detail herein.

Figure 11:
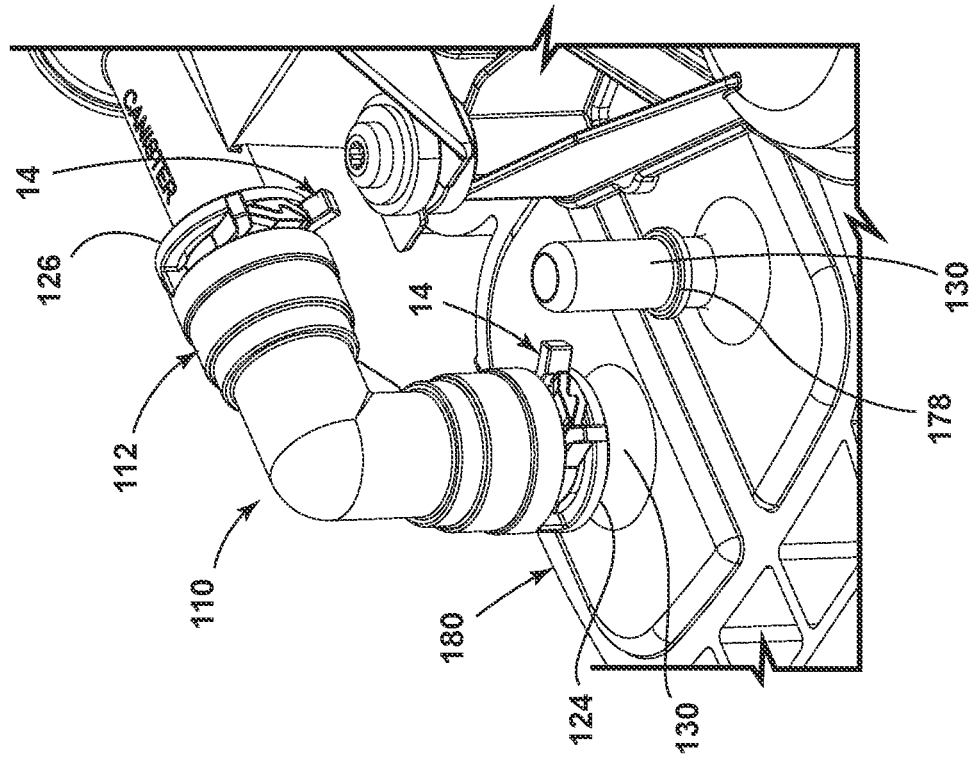
FIG. 11 is an enlarged front perspective view of a portion of FIG. 10 illustrating the clip assembly in the open configuration.
Figure 12:
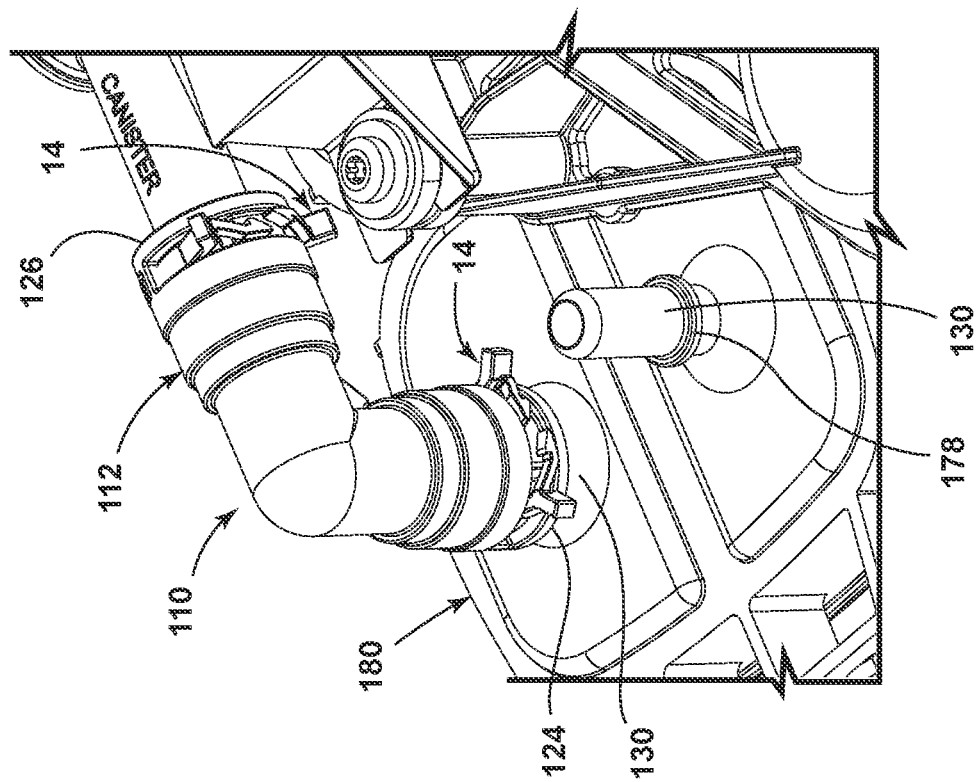
FIG. 12 is an enlarged front perspective view of a portion of FIG. 10 illustrating the clip assembly in the closed configuration.
Figure 14:
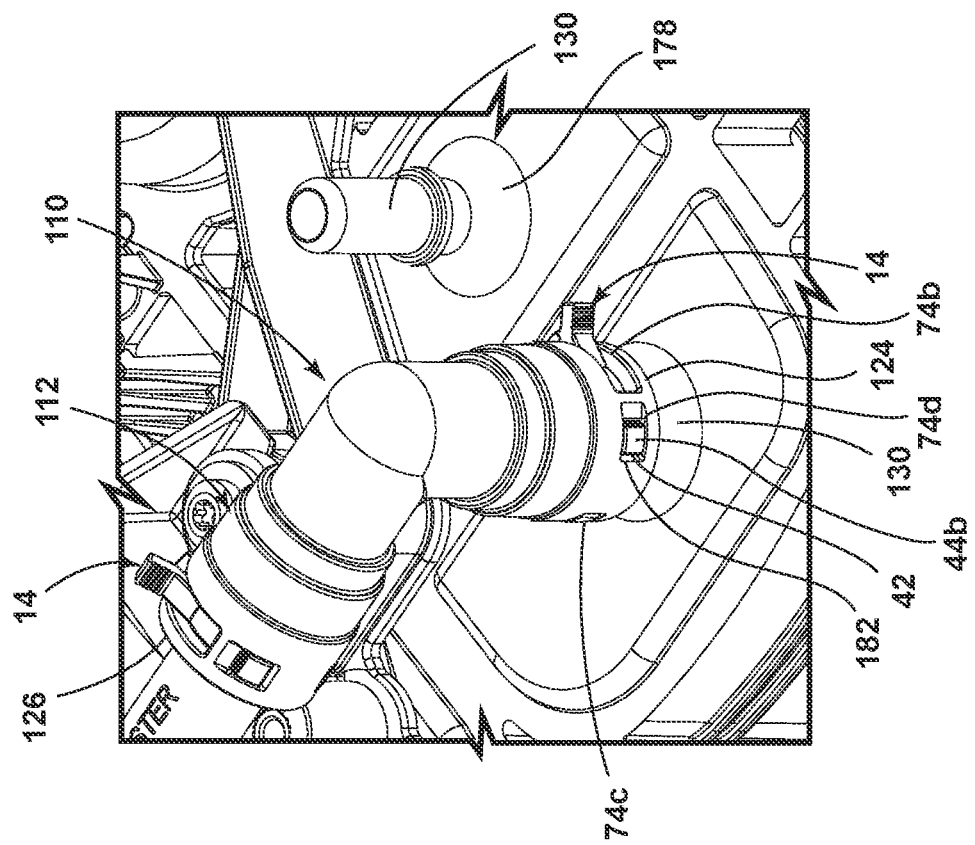
FIG. 14 is an enlarged rear perspective view of a portion of FIG. 10 illustrating the clip assembly in the closed configuration.
Figure 13:
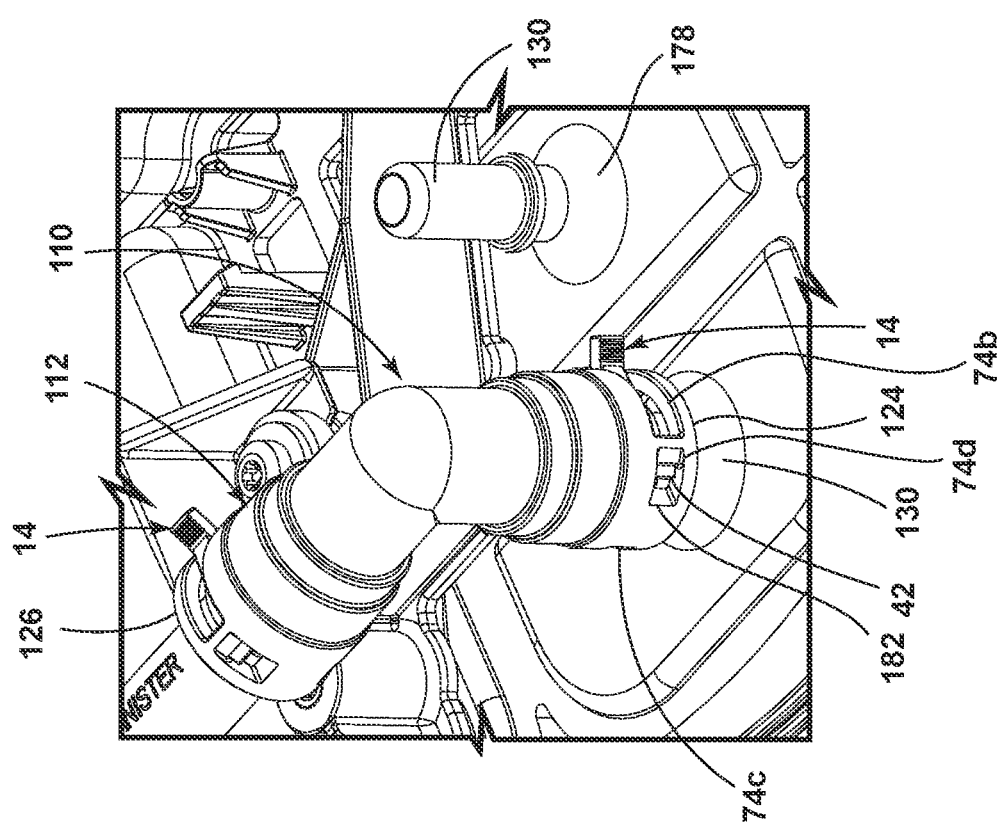
FIG. 13 is an enlarged rear perspective view of a portion of FIG. 10 illustrating the clip assembly in the open configuration.
Figure 15:
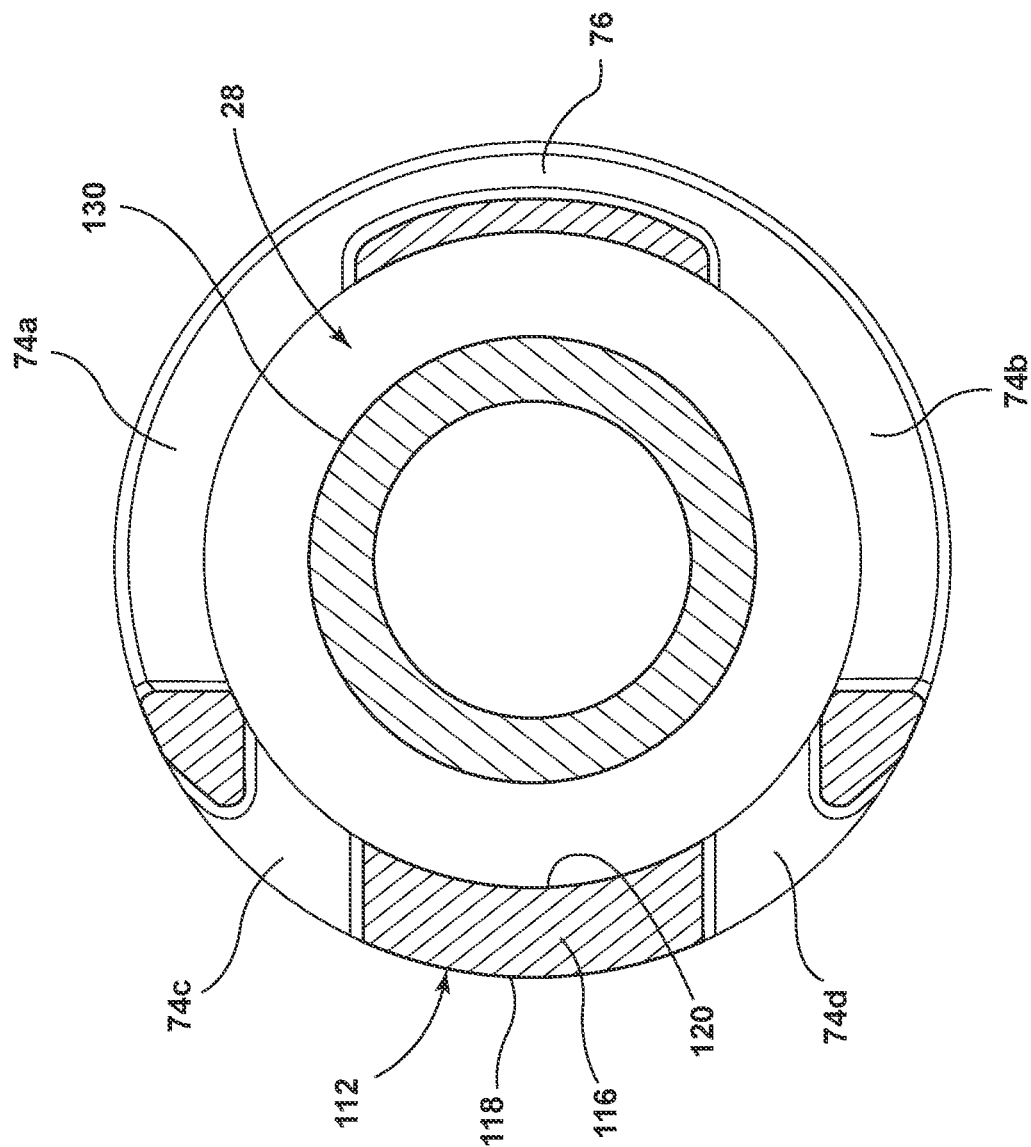
FIG. 15 is a sectional view of a housing of the clip assembly of FIG. 10.
Figure 16:
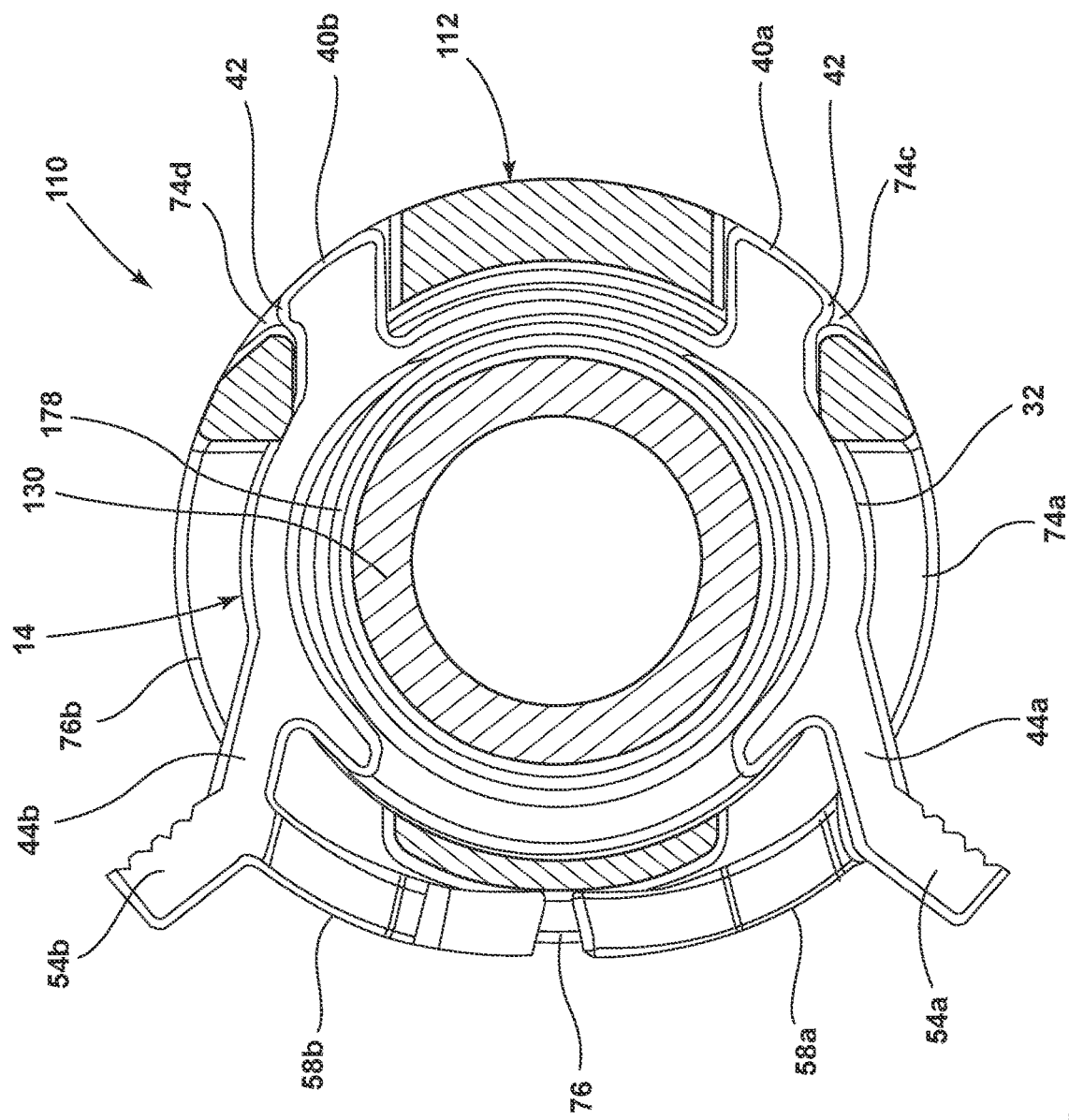
FIG. 16 is a sectional view of the clip assembly of FIG. 10 including the housing and the clip member in the open configuration.
Figure 17:
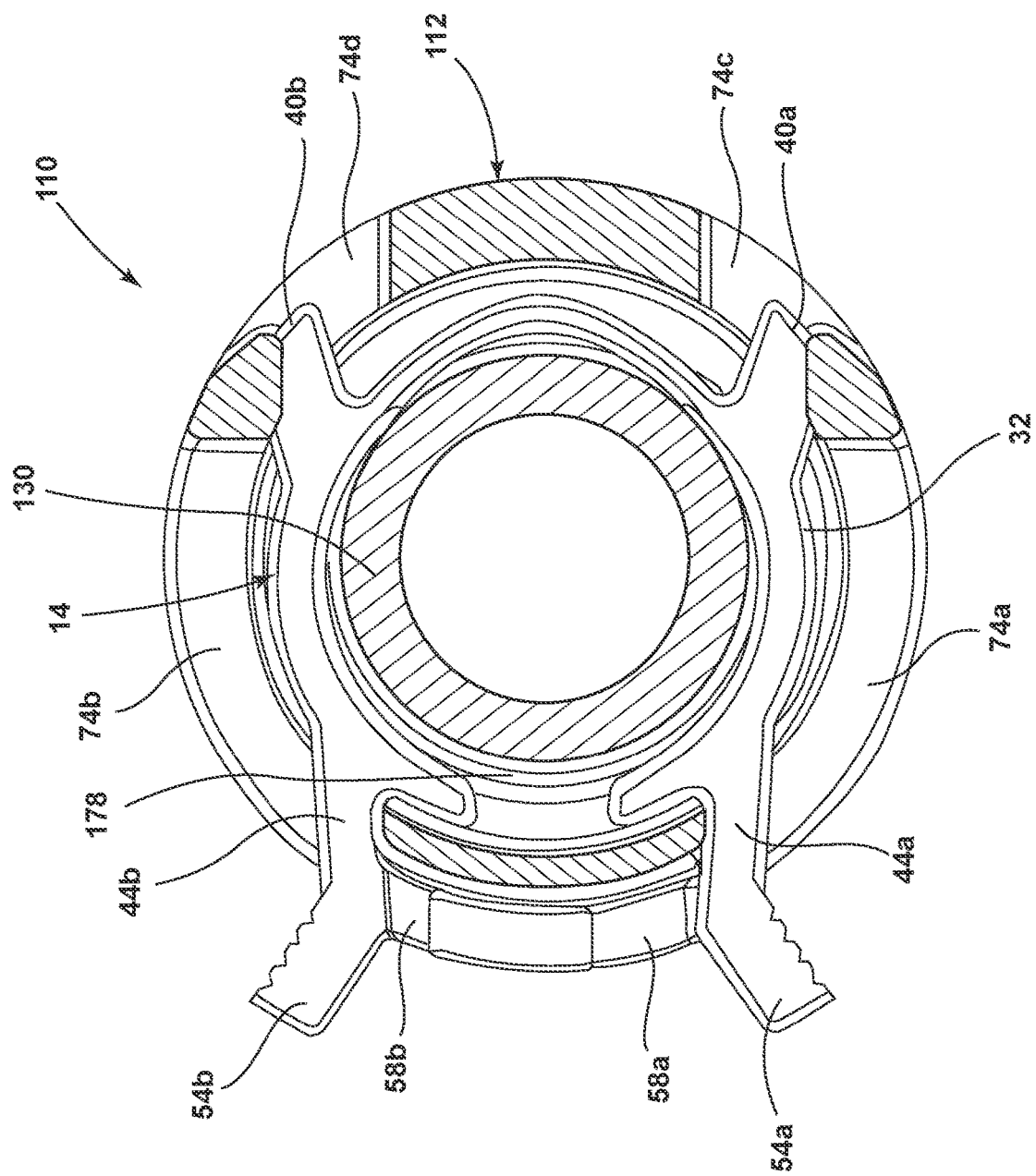
FIG. 17 is a sectional view of the clip assembly of FIG. 10 in the closed configuration.

Relevant to the clip assembly 110, the canister 180 includes fluid inlet/outlet ports in the form of male SAE connectors 130 in the form of a male end form having a bead 178. The housing 112 is in the form of a tubular elbow fitting that connects the canister inlet port with a fuel tank vapor outlet. The housing 112 has two open, female ends 124, 126, and a clip assembly 110 is disposed at each of the two open ends. In FIGS. 11, 13, and 16, the clip members 14 of the assembly are shown in the open configuration, and in FIGS. 12, 14, and 17, the clip members are shown in the closed configuration. As is also apparent from FIGS. 13 and 14, the third and fourth arcuate slots 74*c,d* include an angled side surface 182, and when the clip member 114 is moved to the closed configuration, the angled/inclined edge 42 of the guide posts 44*a,b* engage with the angled side surfaces 182 of the third and further arcuate slots 74*c,d*.

The clip member 14 and housing slots 74*a-d* of the assembly 110 have the same structure as in the embodiment 10, and like reference numbers (e.g., 16 and 116, 18 and 118, 20 and 120, etc.) shown in FIGS. 10-17 represent the same corresponding features as described above with respect to the embodiment 10.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements by ordinal terms, for example "first," "second," and "third," are used for clarity, and are not to be construed as limiting the order in which the claim elements appear. Any reference to claim elements in the singular, for example, using the articles "a," "an," "the" or "said," is not to be construed as limiting the element to the singular.

The invention claimed is:

1. A quick-connect clip assembly for an evaporative emissions canister, the assembly comprising:
   a quick-connector clip including:
      a flexible, arcuate body having an inner surface and an outer surface, the arcuate body extending arcuately from a first terminal end to a second terminal end;
      a pair of guide posts including a first guide post and a second guide post each extending outwardly from the outer surface of the body;
      a pair of finger grips including a first finger grip and a second finger grip, the first finger grip being disposed adjacent the first terminal end of the body and extending outwardly from the outer surface of the body, and the second finger grip being disposed adjacent the second terminal end of the body and extending outwardly from the outer surface of the body; and
      a pair of interlocking snaps including a first snap element and a second snap element, the first snap element extending inwardly from the first finger grip, and the second snap element extending inwardly from the second finger grip and towards the first snap element;
      wherein squeezing of the finger grips draws the first and second snap elements towards each other and causes the first and second snap elements to mate together; and
   a housing including a tubular wall having an open end and defining a receiver therein;
   the tubular wall including a first pair of arcuate slots adjacent the open end, the first pair of arcuate slots including a first arcuate slot and a second arcuate slot that each extend radially along a same circumference of the tubular wall;
   the tubular wall further including a second pair of arcuate slots adjacent the open end, the second pair of arcuate slots including a third arcuate slot and a fourth arcuate slot that each extend radially along the said same circumference of the tubular wall;
   wherein the body of the quick-connector clip is disposed within the receiver, the first finger grip extends through the first arcuate slot, the second finger grip extends through the second arcuate slot, the first guide post extends through the third arcuate slot, the second guide post extends through the fourth arcuate slot, and the first and second snap elements are disposed outside of the tubular wall.

2. The assembly of claim 1, wherein the inner surface of the arcuate body includes a pair of chamfers.

3. The assembly of claim 2, wherein the chamfers are between the guide posts and the terminal ends of the arcuate body.

4. The assembly of claim 1, wherein the first and second finger grips each include an inner surface and an outer surface, the inner surface of the first finger grip facing the inner surface of the second finger grip, and the first snap element extending from the inner surface of the first finger grip and the second snap element extending from the inner surface of the second finger grip.

5. The assembly of claim 1, wherein the first and second finger grips each include a terminal portion that is bent outwards, and the terminal portion includes a contoured gripping surface.

6. The assembly of claim 1, wherein each of the first and second snap elements includes a base connected to its respective finger grip, a terminal lock part, and a bent portion extending between the base and the terminal lock part.

7. The assembly of claim 6, wherein each of the finger grips include a first side surface and an opposite second side surface, the base of the first snap element is adjacent the first side surface of the first finger grip, and the base of the second snap element is adjacent the second side surface of the second finger grip.

8. The assembly of claim 1, wherein in relation to the body, the first finger grip is generally opposite the first guide post, and the second finger grip is generally opposite the second guide post.

9. The assembly of claim 1, wherein the quick-connector clip is of a single piece, unitary construction.

10. The assembly of claim 1, wherein the first and second arcuate slots have a same radial length, and the third and fourth arcuate slots have a same radial length.

11. The assembly of claim 1, wherein the radial length of the first and second arcuate slots is larger than the radial length of the third and fourth arcuate slots.

12. The assembly of claim 1, wherein the first arcuate slot is adjacent the third arcuate slot, and the second arcuate slot is adjacent the fourth arcuate slot.

13. The assembly of claim 1, wherein the tubular wall of the housing further includes an arcuate depression in which the first and second snap elements are disposed, and the arcuate depression extends between the first arcuate slot and the second arcuate slot.

14. The assembly of claim 1, further including a male connector, the male connector including a tubular end form and a bead circumscribing the tubular end form;
wherein the tubular end form is received in the receiver of the housing such that the bead is positioned inward relative to the quick-connector clip, the first and second snap elements are drawn towards each other by squeezing the first and second finger grips together, and the first and second snap elements are interlocked whereby the body of the quick-connector clip blocks the bead of the male connector to prevent release of the male connector from the receiver.

15. The assembly of claim 1, where the male connector is a port of the evaporative emissions canister.

16. A method of quick-connection to a port, the method comprising:
providing the quick-connect clip assembly of claim 1;
mating a male connector with the receiver of the clip assembly, wherein the male connector is the port and includes a tubular end form and a bead circumscribing the tubular end form, and the tubular end form is inserted into the receiver of the housing such that the bead is positioned inward relative to the quick-connector clip;
squeezing the first and second finger grips of the quick-connector clip towards each other to flex and compress the body of the quick-connector clip until the first and second snap elements engage and interlock, wherein the compressed body of the quick-connector clip has a diameter that is less than a diameter of the bead of the male connector whereby the body blocks the bead of the male connector to prevent release of the male connector from the receiver.

17. The method of claim 16, further comprising:
disconnecting the male connector from the receiver by further squeezing the first and second finger grips to separate and disengage the first and second snap elements such that the body of the quick-connector clip returns to a resting configuration having a diameter that is greater than the diameter of the bead of the male connector whereby the male connector is freely removable from the receiver of the housing.

18. An evaporative emissions canister including the quick-connect clip assembly of claim 1.

19. The evaporative emissions canister of claim 18, including a fluid port having a male connector, wherein the clip assembly is mated with the male connector.

* * * * *